April 28, 1953   C. MOREY   2,636,515
LOCKABLE VALVE OPERATING MECHANISM
Filed Sept. 4, 1945   4 Sheets-Sheet 4

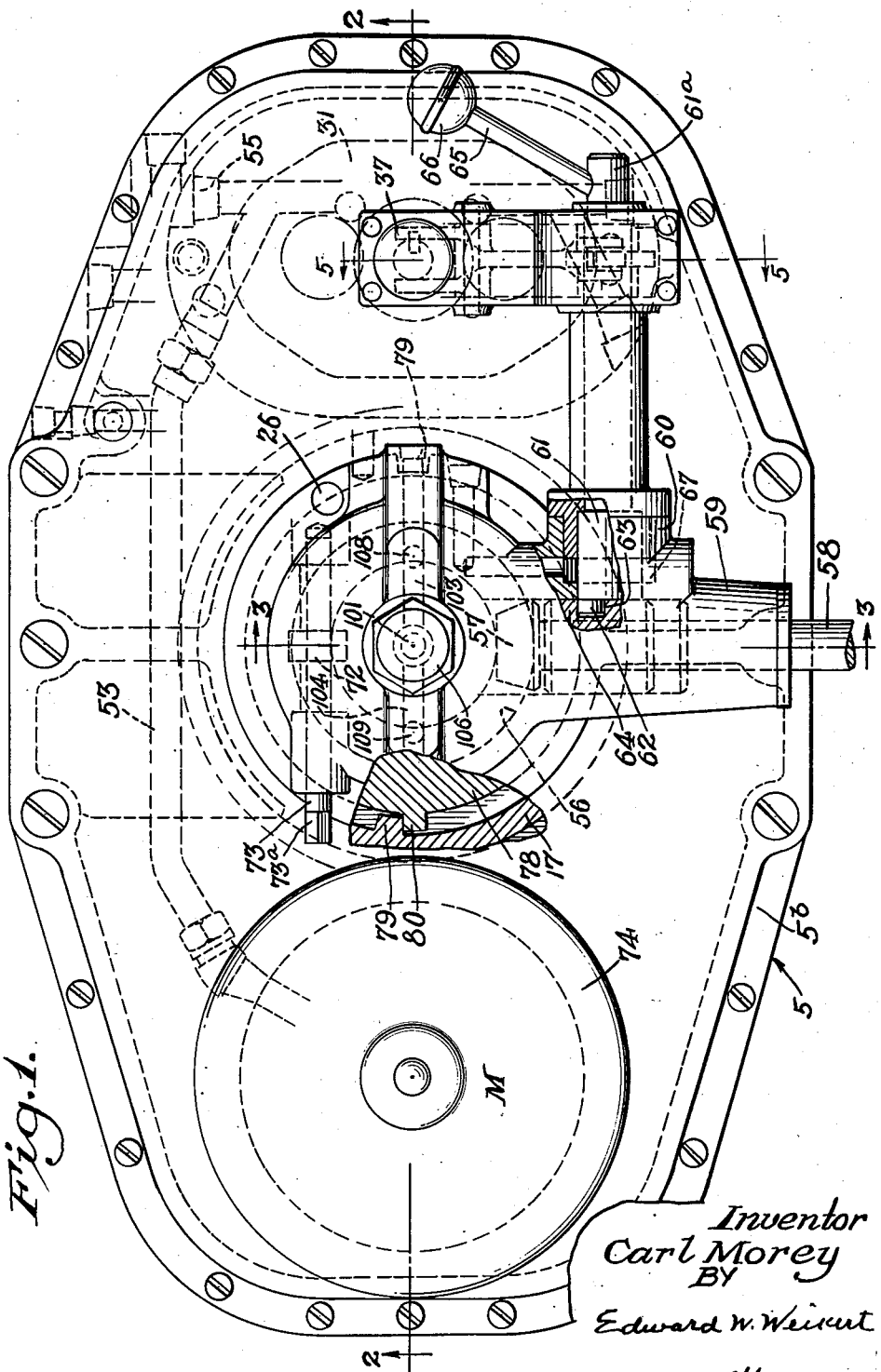

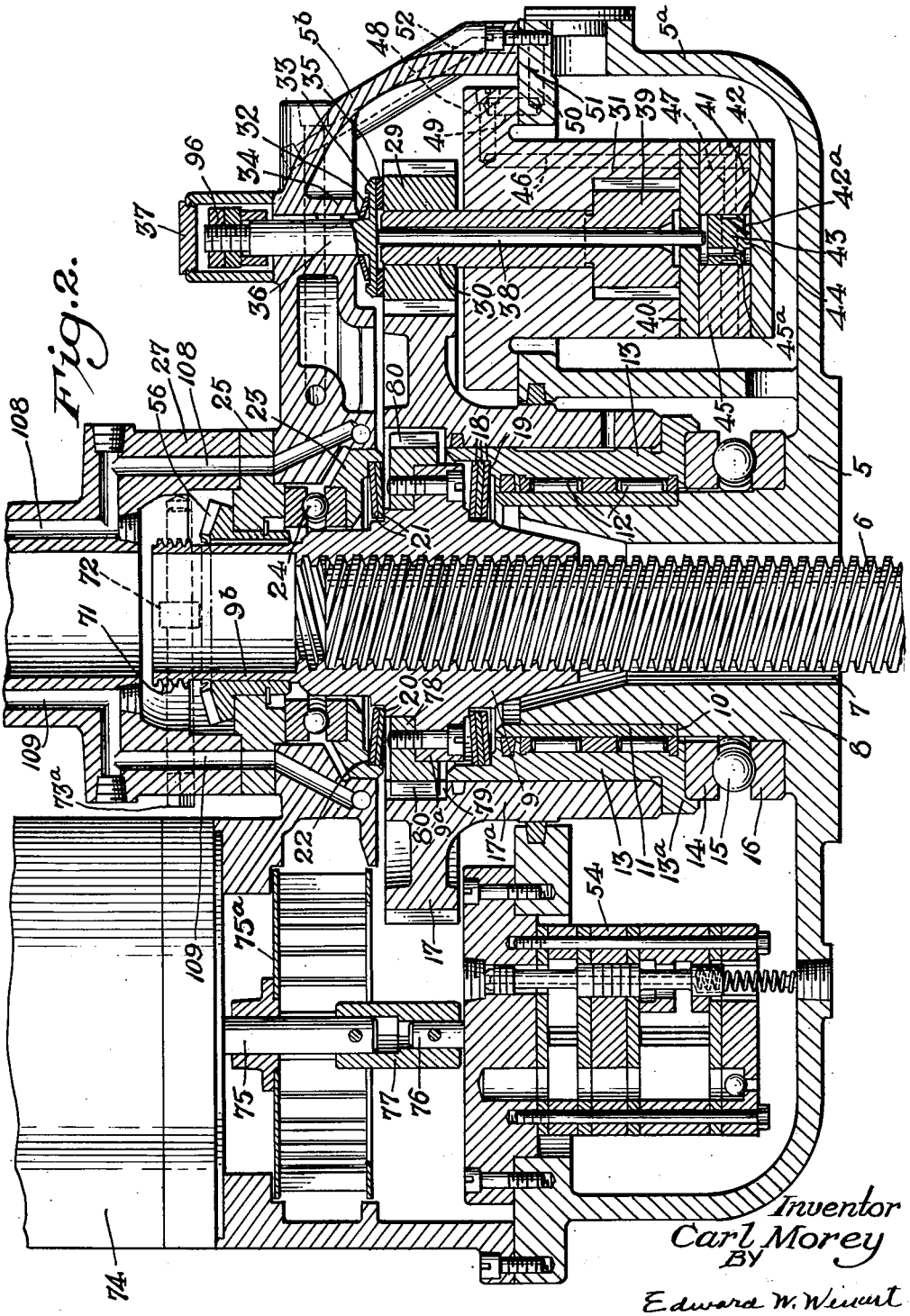

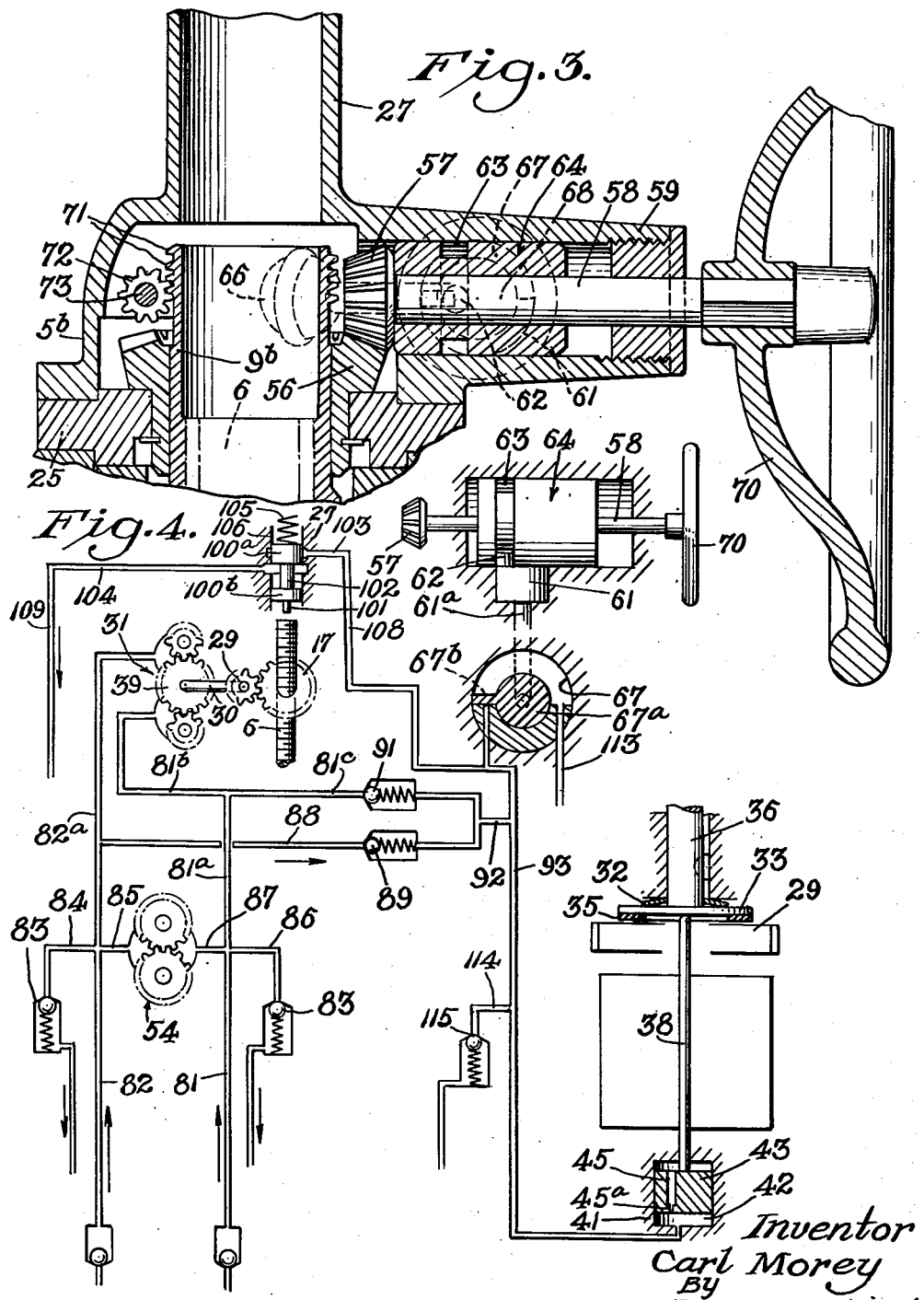

Inventor
Carl Morey
By
Edward W. Weinert
Attorney.

Patented Apr. 28, 1953

2,636,515

UNITED STATES PATENT OFFICE 2,636,515

LOCKABLE VALVE OPERATING MECHANISM

Carl Morey, Hamilton, Ohio, assignor to Economy Pumps, Inc., Hamilton, Ohio, a corporation of Illinois Application September 4, 1945, Serial No. 614,274

12 Claims. (Cl. 137—641)

This invention relates to a lockable valve operating mechanism and concerns itself primarily with means for normally locking the operating parts against movement, to retain the valve properly seated against rising or creeping movement.

To this end, the operating means which is driven by a fluid or hydraulic system is automatically locked as soon as the said operating means is stopped and is automatically unlocked when the operating means is started.

The invention also includes in addition to the power operated means, a manual operating mechanism which can be manually thrown into or out of operative position, together with automatic fluid operated means for throwing said manual operated means into inoperative position when the apparatus is started in the event that it has not been manually thrown to inoperative position. This will insure against injury thereto.

Other features of novelty and advantage will be pointed out in the following description and disclosure.

The invention comprises the novel structure and combination of parts hereinafter described and more particularly pointed out and defined in the appended claims.

In the accompanying drawing, which illustrates a preferred form of this invention, and in which similar reference numerals refer to similar features in the different views:

Fig. 1 is a top plan view of a valve operating mechanism involving this invention with parts shown in section;

Fig. 2 is a sectional view taken substantially upon the line 2—2 of Fig. 1 looking in the direction of the arrows;

Fig. 3 is a sectional view taken substantially upon the line 3—3 of Fig. 1 looking in the direction of the arrows;

Fig. 4 is a diagrammatic view of the hydraulic operating system;

Figure 5:
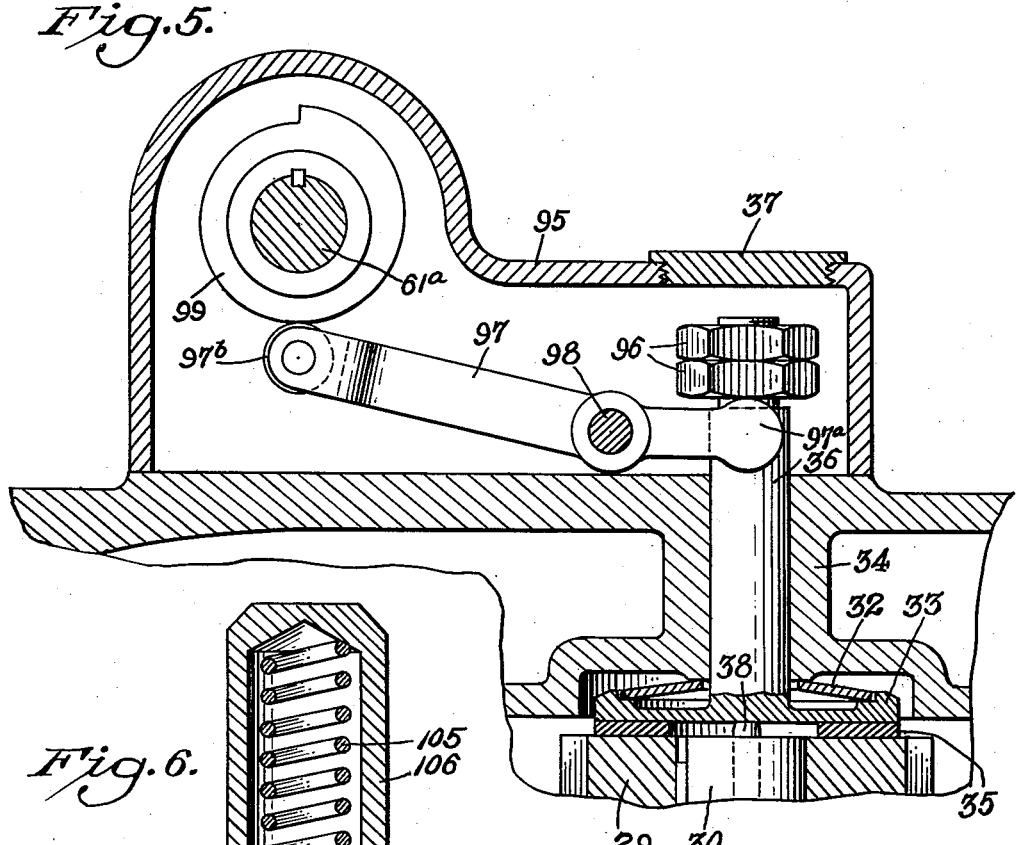
Fig. 5 is an enlarged sectional view taken upon the line 5—5 of Fig. 1 looking in the direction of the arrows, but with parts in reversed position.
Figure 6:
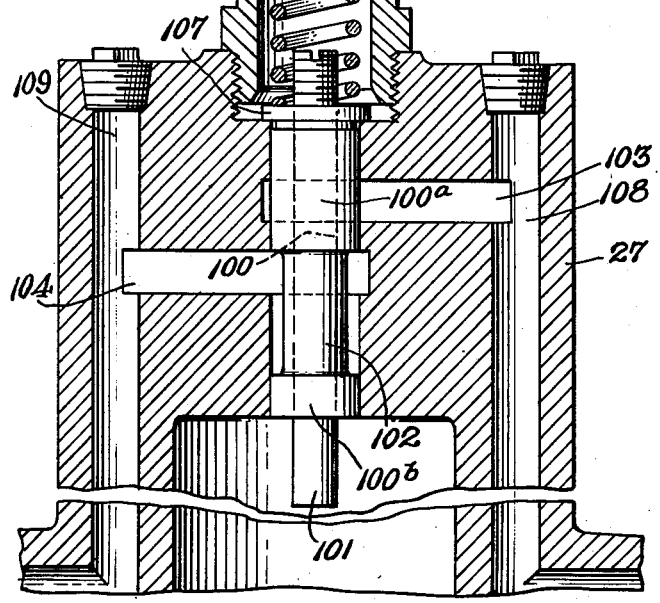
Fig. 6 is a sectional view forming a continuation of Fig. 2.

In referring to the drawing, it will be noted that the operating mechanism is housed in a casing 5 which is substantially oblong so as to extend upon both sides of the valve stem 6 which is threaded throughout a portion of its extent. This housing has a lower section 5a and a removable top section 5b, whereby such upper section may be removed for access to the housing. The housing or casing 5 is provided with a suitable aperture 7 for receiving the valve stem and a wall 8 surrounding the aperture from the bottom to a suitable point thereabove. This wall 8 has an interior conical upper end for receiving a diverging end of a screw sleeve 9 threaded upon the stem.

The wall 8 which is circular is provided with a rabbet 10 extending from its upper end to a point substantially midway thereof for receiving a bearing sleeve 11 against which radial rollers 12 are confined by an outer bearing sleeve 13 having an outwardly directed flange 13a at its base which rests upon the upper bearing ring 14 of a ball bearing 15, the lower bearing ring 16 of which is seated upon the casing 5. The hub sleeve, 17a of a gear 17 surrounds the bearing sleeve 13 with its lower end seated upon the flange or foot 13a thereof.

It will be noted that the screw sleeve 9 has an intermediate flange or square rib 9a. Cushioning end thrust means in the form of flat rings 18 are mounted between the flange 9a and an annular shoulder 19 formed on the bearing sleeve 13. As a result the screw sleeve 9 will be maintained against undue endwise movement in a downward direction.

The screw sleeve 9 is provided with an annular shoulder 20 above the rib 9a and end thrust cushioning rings 21 are mounted between the shoulder 21 and an opposed shoulder 22 on a rotary supporting ring 23 mounted in the casing. It will be noted that the screw sleeve 9 is confined against undue endwise movement by these two sets of rings so that during its rotation, it will cause vertical movement of the valve stem 6. A suitable ball bearing 24 is mounted between the supporting ring 23 and an annular bearing block 25 surrounding the valve stem 6 and bolted to the top of the casing by bolts 26 which also serve to anchor a top member 27 to the casing.

The aforementioned gear 17 is adapted to be driven in either direction by a pinion 29 secured upon the upper end of the shaft 30 of a hydraulic motor 31 mounted in the right hand portion of the section 5a of the casing. In order to lock the valve stem in lowered or set position, means have been provided for normally locking the gear 29 against rotation. While this means may assume various forms as a matter of illustration, there is shown a concave ring 32 of Bellville spring positioned between a plunger head 33 and the lower end of a bearing 34 on the casing section 5b. Friction brake lining 35 is positioned between the plunger head 33 and the upper face of the gear 29; it is preferably attached to the plunger head.

The spring ring 32 normally forces the plunger head downward and compresses the brake lining against the face of the gear 29 for frictionally locking the same against movement. The plunger head 33 carries a stem 36 slidably mounted in the bearing 34 which is closed at its top by a plug 37.

In starting an operation, it is necessary to release or unlock gear 29, and this is effected by means of a push rod 38 which extends slidably through the center of the hydraulic motor shaft 30, the gear 29 and the base 40 of the hydraulic motor. Below the base 40 of the hydraulic motor, there is a suitable structure 41 which forms a cylindrical fluid chamber 42 directly below the end of the push rod 38. A piston 43 is slidably mounted within the chamber and is provided with a teat 44 at its lower face which spaces it from the lower surface of the chamber so fluid under pressure can enter beneath the piston. It will be noted that the upper surface of the piston is spaced a short distance below the base 40 and is in engagement with the lower end of the push rod 38. As a result, when the piston is elevated by fluid pressure, the push rod 38 will be elevated for elevating the plunger head against the tension of the spring ring 32 for releasing or unlocking the gear 29 for operation. As long as the fluid pressure exists which occurs during an operation, the gear 29 will be held released or unlocked. The piston 43 is provided with a fluid escape passage 45 which terminates at its lower end in a restricted bleeder passage 45a.

Fluid is admitted to the piston chamber 42 through the passages 46 and 47 shown in dotted lines. The passage 47 discharges to the bottom of the piston through a cut-away 42a in the piston.

The fluid passage 46 which is located in the casing of the hydraulic motor 31 communicates with a short passage 48 extending in a horizontal direction therein and this passage 48 communicates with a downwardly directed passage 49 which leads to a passage 50 in a casing support 51 for the motor. The passage 50 receives fluid from a pipe or hose 52 which connects with the supply pipe 53 (Fig. 1) extending from the pump 54 upon the other side of the casing. The pump is also designed to supply fluid to the hydraulic motor 31 through pipe 53 connecting with inward supply pipe 55. The fluid piping will be duplicated for supplying both sides of the hydraulic motor so that the same can be driven in either direction as will later appear from the fluid circuit shown in Fig. 4.

The valve stem 6 is also adapted to be manually controlled through hand operated gearing that will now be described. A gear 56 is secured to the upwardly extending sleeve 9b of the screw sleeve 9 and this gear is adapted to be engaged by a pinion 57 (Fig. 3) secured upon a slidable shaft 58 journalled in a suitable bearing 59 projecting from the upper section of the casing. The bearing 59 has a bearing 60 (Fig. 1) projecting from one side in which a cylinder 61 is rotatably mounted. The inner end of the cylinder has an eccentrically mounted pin 62 projecting therefrom which engages a groove 63 in a bearing sleeve 64 surrounding the shaft 58 and secured thereto. A handle 65 with a knob 66 extends diagonally from a shaft 61a on the cylinder whereby the cylinder may be turned for moving the shaft 58 for engaging the gear 57 with the gear 56 and also disengaging the same.

However in the event that the attendant fails to disengage the gear 57 from the gear 56 after a manual operation, it will be automatically disengaged before a power operation becomes effective. This is to prevent injury to the parts. This automatic operation arises from the use of a paddle motor 67 which operates the shaft 61a (Figs. 1 and 4) which has the eccentric pin 62 thereon that engages the said groove 63. When the pump 54 is set in motion and fluid is supplied to the hydraulic motor, fluid is also supplied to the paddle motor for operating the same for rotating shaft or cylinder 61 for shifting gear 57 out of mesh with gear 56 as will later more fully appear. Rotation of shaft 58 in a manual manner is adapted to be effected through handle wheel 70 secured to the outer end of the shaft.

Since the screw sleeve 9 is normally locked against movement by the frictionally locked gear 29 of the hydraulic motor, it would be difficult to operate the manual mechanism 70. Accordingly, means have been provided for manually unlocking gear 29 when it is desired to manually operate the valve stem 6. This means is best shown in Fig. 5. In referring to this figure, it will be noted that the stem 36 of the locking plunger head 32 extends above the bearing 34 and into a suitable housing 95 where it is equipped with an end abutment in the form of a pair of nuts 96, the outer one of which may be a lock nut. A lever 97 pivoted upon an axis 98 in the housing 95 has its weight arm 97a in the form of a yoke engaging the plunger stem 36 beneath the abutment 96—96. The power arm of this lever 97 is provided with a roller 97b which engages a cam 99 secured upon the shaft 61a. At the beginning of each operation, the manually operated gear 57 is thrown out of gear by the paddle motor as previously set forth. In Fig. 1 of the drawing, the gear 57 is shown in mesh with the gear 56 ready for a manual operation, but in Fig. 5, the parts are shown in reversed position when the gear 57 is out of mesh. For manual operation, shaft 61a will be rotated for throwing gear 57 into mesh by pin 62 and cam 99 will operate lever 97 for elevating the brake disc 33 and unlocking gear 29. That is, when shaft 61a is manually rotated to engage gear 57 with gear 56, it also causes the lifting of the brake.

When the valve stem 6 has been elevated for opening the valve through the operated means, it might be desirable to release the pressure especially if the valve were held open for a considerable period. For this purpose, the upper portion of the top member 27 is provided with a slide valve 100 having a stem 101 which extends downwardly adapted for engagement by the upper end of the valve stem 6 when the same has been elevated. This valve has two spaced head portions 100a and 100b with a reduced portion 102 therebetween which is adapted to put the two opposite ports 103 and 104 in said member into communication when the valve has been elevated by the valve stem 6.

The valve 100 is normally held in closed position by a coil spring 105 which is housed in a thimble cap 106 threaded in the top of the member 27 and which bears against a washer 107 secured upon the upper end of the valve 100.

The port 103 which is the inlet port, leads to a vertical fluid passage 108 in the wall of the member 27 and this passage 108 leads downwardly through member 25 and into the casing where it communicates with the fluid line from the pump. The port 104 which is the outlet port leads to a vertical passage 109 in the wall of the member 27, the member 25 and the casing where it discharges into the fluid tank formed in the bottom of the casing. As a result, when valve 100 is open, fluid from the pressure line can escape through passage 108, port 103, port 104, and passage 109 to the tank. Thus it becomes possible to relieve the pressure when the main valve is open affording protection to the operating parts in the event that the motor is not stopped.

The upper end portion of the screw sleeve 9 is provided with worm teeth 71 which are engaged by a pinion 72 secured upon a shaft 73 having a polygonal end 73a (Fig. 1) adapted for operating an indicating or timing mechanism, not shown. When the screw sleeve is rotated, the shaft 73 will be rotated for operating an indicating mechanism which may be of any suitable type or as shown in my co-pending application Ser. No. 588,340, filed April 14, 1945, which has issued as Patent No. 2,582,556, dated January 15, 1952.

Upon the top of the casing section 50 above the pump 57, there is mounted a reversing motor 74, the shaft 75 of which is coupled to the pump shaft 76 by a suitable coupling 77. If desirable, a coroco fan 75a may be secured upon the motor shaft to circulate air through the mechanism to remove condensate when present and assist in cooling the unit. The pump furnishes the fluid for unlocking the gear 29 and for operating the paddle motor and the hydraulic motor 31. When gear 29 is released, it will rotate gear 17 which is coupled or clutched to the screw sleeve 9 through an angular clutch member 78 bolted to the rib 9a of the sleeve; the interior surface of the gear 17 having a pair of lugs 79 (Fig. 1) spaced 180 degrees apart for cooperating with a lug 80 on the member 78. The lugs may be variously arranged to provide an impact producing lost motion of about 180 degrees.

In referring to Fig. 4, there is shown in diagrammatic form the fluid circuit in its relation to the operating parts. In this view, the pump 54 is connected to the oil tank or source of fluid supply through pipes 87 and 81 which lead to one side of the pump and pipes 85 and 82 which lead to the other side of the pump. Each pipe 81 and 82 has a relief or safety valve 83 adapted to discharge into the oil tank. Pipe 81 has a pipe connection 85 with its relief valve while pipe 82 has a pipe connection 84 with its relief valve.

When the pump 54 is running in the direction to draw fluid through pipe 81 and 87, this fluid will be discharged through pipe 85 and into pipe 82a which leads to the hydraulic motor 31 for operating the same in one direction. The pipe 82a is also connected to a pipe 88 having a check valve 89. Beyond the check valve 89, the pipe 88 is connected to pipe 92 which leads to pipe 93 that supplies the paddle motor 67 and the piston chamber 42. Thus the hydraulic motor 31, the paddle motor 67 and the unlocking piston 43 are simultaneously set in motion. It will be noted in Fig. 4 that the paddle motor has a rotor 67a with the shaft 61a shown diagrammatically extending therefrom and which shaft carries the cylinder 61 with the eccentric pin 62. The rotor is provided with a vane piston 67b against which the fluid acts for rotating the rotor when fluid pressure enters the motor casing thru pipe 93.

When the pump 54 is operating in the opposite direction, it will draw fluid thru pipes 82 and 85 and discharge the same thru pipe 87 which is also connected to a feed pipe 81a which has a branch 81b leading to the hydraulic motor 41 for rotating the same in the other direction, and a branch 81c having a check valve 91. Beyond the check valve, pipe 81c is connected to pipe 92 which feeds pipe 93 which in turn feeds the paddle motor 67 and the piston chamber 42. As a result, the hydraulic motor, the paddle motor and the unlocking piston 43 are simultaneously set in motion in the same manner as when the pump is driven in the other direction previously described.

The pipe 93 is connected by a pipe 108 with the valve housing 27. The valve 100 in this housing normally closes the port to pipe 108. The valve housing 27 is also provided with a discharge pipe 109 which is connected to the valve housing between the upper head 100a and the lower head 100b. As a result, when the valve stem 6 is in its elevated or withdrawn position and opens valve 100, fluid can escape from the pressure line thru pipes 108 and 109 for relieving the pressure in the system.

The paddle motor is provided with an escapement port 113 and the pipe 93 may be provided with an escape pipe 114 having a valve 115 therein for the escape of fluid from the paddle motor. This pipe is adapted to discharge into the tank. But the valve in pipe 114 should have a greater resistance than the resistance of the relief valves. The fluid from the hydraulic motor 31 is adapted to escape by any suitable means from the casing and return to the fluid tank in the casing. Such means have not been shown since the same is old and well known.

It will be evident, that according to this invention the valve operating mechanism is frictionally locked against operation as soon as the fluid power is cut off and it becomes impossible for the main valve to creep or lose a firm seat. It will also be evident that the operating mechanism is safeguarded in that the manual drive is always disconnected before the power drive gets under way to any extent and in that the fluid pressure is relieved when the main valve has been opened to the extent to operate valve 100. It is characteristic of this invention that these operations occur simultaneously to a certain extent and automatically when the fluid is set in motion by starting the motor driven pump.

I am aware that many changes may be made and various details of construction may be modified without departing from the principles of this invention so I do not propose limiting the patent granted thereon otherwise than necessitated by the appended claims.

I claim as my invention:

1. In a valve operating mechanism, a stem, means for moving said stem in either of two directions including a fluid system and an operated member, automatically operated means for normally locking said member against movement and a movable element responsive to the pressure in said fluid system for unlocking said member at the beginning of an operation.

2. In a valve operating mechanism, a valve stem, means for moving said stem in either direction including an operating member, a hydraulic motor having a connection with said operating member, friction locking means automatically operable for normally locking said operating member against movement, means including a fluid pressure system for operating said hydraulic motor and means responsive to the fluid pressure in said system for unlocking said locking means and maintaining the same unlocked during the operation of said motor.

3. In a valve operating mechanism, a valve stem, having a threaded portion, a screw sleeve on said threaded portion, means for maintaining said screw sleeve against endwise movement, a gear surrounding said sleeve and having a lost motion connection therewith, a pinion in driving relation with said gear, a hydraulic motor having a connection with said pinion, automatically operated means for normally locking said pinion against rotation, a fluid pressure system for operating said hydraulic motor and means responsive to the fluid pressure in said system for releasing said locking means and maintaining the same unlocked during operation.

4. In a valve operating mechanism, a valve stem, means for operating said stem including a rotary member, a plunger head having a friction surface for engaging said rotary member, yielding means for urging said plunger head against said rotary member, a hydraulic motor connected to said rotary member for rotating the same, a fluid pressure system for operating said hydraulic motor and means responsive to the fluid pressure in said system for moving said plunger head to inoperative position.

5. In a valve operating mechanism, a valve stem, means for moving said valve stem in either of two directions including a movable member, said stem and movable member having interengaging parts for causing relative movement thereof during operation of said movable member, a rotary member having a driving connection with said movable member, an hydraulic motor having a driving member operatively connected to said rotary member, automatically operated means for normally locking one of said members, a fluid pressure system for operating said hydraulic motor and means responsive to the fluid pressure in said system for releasing said locking means at the beginning of an operation.

6. In a valve operating mechanism, a valve stem means for operating said valve stem, including a driving member, means normally locking said driving member against operation, a fluid pressure system for operating said driving member and means responsive to the initiation of said fluid pressure system for unlocking said driving member and maintaining the same unlocked during the operating period.

7. In a valve operating mechanism, a valve stem, means including an actuatable member for operating said stem, automatic means normally locking said actuatable member against operation, said operating means also including a fluid pressure system and means responsive to the initiation of said fluid pressure system for unlocking said actuatable member.

8. In a valve operating mechanism, a valve stem, means for operating said stem including a power driven rotary member, braking means normally engaging and braking said rotary member against rotation, means for manually operating said valve stem including a rotatable mechanism shiftable from inoperative to operative position and means actuated by said mechanism when shifted to operative position for moving said braking means for releasing said rotary member.

9. In a valve operating mechanism, a valve stem, means including a power driven rotary element for operating said stem, a yieldably actuated brake normally engaging and locking said rotary element against rotation, manually actuated means for also actuating said valve stem including a shiftable member and mechanism connecting said shiftable member with said brake and operative for releasing said brake when said shiftable member is shifted in one direction.

10. In a valve operating mechanism, a valve stem, means including a power driven pinion for operating said stem, a spring pressed brake normally engaging said pinion for preventing rotation thereof, manual operating mechanism for operating said stem and means connecting said manual operating mechanism and brake for releasing said brake upon the initiation of said manual operating mechanism for operating said stem.

11. In a valve operating mechanism, a threaded valve stem, a sleeve threaded upon said stem, a gear surrounding said sleeve and having a lost motion connection therewith, a hydraulic motor having a pinion in driving relation with said gear, spring pressed friction means for normally retaining said pinion against rotation, a source of fluid supply for said motor and means responsive to the fluid pressure from said source for lifting said spring pressed friction means from frictional engagement with said pinion.

12. In a valve operating mechanism, a valve stem, means for moving said valve stem in either direction including a rotary member, a hydraulic motor connected to said rotary member for operating the same, a fluid pressure system for operating said motor, a spring pressed brake for normally braking said rotary member against rotation, and means responsive to fluid pressure in said system for operating said brake for releasing said rotary member upon the initiation of said fluid system for moving said stem to valve open position.

CARL MOREY.

References Cited in the file of this patent

UNITED STATES PATENTS

| Number | Name | Date |
|---|---|---|
| 189,049 | Mann | Apr. 3, 1877 |
| 706,086 | Muller | Aug. 5, 1902 |
| 1,148,465 | Sayer | July 27, 1915 |
| 1,293,446 | Hugo | Feb. 4, 1919 |
| 1,662,134 | Smith | Mar. 13, 1928 |
| 1,693,273 | Hankison et al. | Nov. 27, 1928 |
| 1,886,518 | Beckwith | Nov. 8, 1932 |
| 1,997,646 | Miller | Apr. 16, 1935 |
| 2,028,696 | Beckwith | Jan. 21, 1936 |
| 2,059,152 | Smith | Oct. 27, 1936 |
| 2,160,217 | Kingsburg | May 30, 1939 |
| 2,172,440 | Edmonston | Sept. 12, 1939 |
| 2,211,406 | Cannon | Aug. 13, 1940 |
| 2,326,398 | Shafer | Aug. 10, 1943 |
| 2,352,140 | Trott | June 20, 1944 |
| 2,366,398 | Harrington | Jan. 2, 1945 |
| 2,387,215 | Fawkes | Oct. 16, 1945 |